United States Patent [19]

Butt et al.

[11] Patent Number: 5,022,698
[45] Date of Patent: Jun. 11, 1991

[54] VEHICLE SEAT

[75] Inventors: Timothy R. Butt, Kaiserslautern, Fed. Rep. of Germany; Sergio Zolin, Sao Paulo, Spain

[73] Assignee: Keiper Recaro GmbH & Co., Fed. Rep. of Germany

[21] Appl. No.: 508,424

[22] Filed: Apr. 13, 1990

[30] Foreign Application Priority Data

Apr. 15, 1989 [DE] Fed. Rep. of Germany ....... 3912463

[51] Int. Cl.[5] .............................. B60N 2/36
[52] U.S. Cl. ................... 296/65.1; 297/379
[58] Field of Search .............. 296/65.1; 297/331, 335, 297/379, 336

[56] References Cited

U.S. PATENT DOCUMENTS

| 4,759,580 | 7/1988 | Berklich, Jr. | 296/65.1 |
| 4,793,649 | 12/1988 | Yamano et al. | 296/65.1 |
| 4,840,427 | 6/1989 | Hong | 296/65.1 |
| 4,925,229 | 5/1990 | Seibler | 296/65.1 |
| 4,932,706 | 6/1990 | Wainwright | 296/65.1 |
| 4,932,709 | 6/1990 | Wainwright | 296/65.1 |

*Primary Examiner*—Robert R. Song
*Attorney, Agent, or Firm*—Wigman & Cohen

[57] ABSTRACT

A vehicle seat having at least one hinge fitting, the upper fitting element (10) of which is associated with the backrest (11) and the lower fitting element of which is associated with the seat frame, has a hook (14) which is arranged so as to be pivotable in a suspended manner, runs parallel to the hinge axle in its locked position, and securely engages behind lock bolts (29) to be connected with the floor of the vehicle. The upper fitting element (10) has a detent (28) in a surface (27) that extends in its pivot direction. A counter detent (22') is provided at one end of a double-armed pivot lever (20), which is pivotably mounted on the lower fitting element and is spring-loaded in the sense of moving the counter detent (22') toward the detent (28). The detent (28) and the counter detent (22') are in engagement in an angular position of the upper fitting element (10) that lies outside of the use position of the backrest (11), and form a form-fitting pivot block for the upper fitting element (10).

14 Claims, 12 Drawing Sheets 5,022,698

VEHICLE SEAT

BACKGROUND OF THE INVENTION

The invention relates to a vehicle seat having at least one hinge fitting, the upper fitting portion of which is associated with the backrest and the lower fitting portion of which is associated with the seat frame, and having a pivotable hook suspended in such a manner that in its locked position it engages behind a lock bolt running parallel to the hinge axis.

In the known vehicle seats of this type the hook forms one element of a so-called free-pivot mechanism for the backrest. If the hook is pivoted into its release position, the backrest can be folded forward without having to activate the adjusting device provided for adjusting the angle of inclination of the backrest.

If a vehicle seat of this type is often removed and reinstalled, or taken from a use position into a non-use position and back, as is primarily the case in automobiles which, if necessary, can be equipped with an additional row of seats, then there is a danger that the seat is not properly connected to the floor of the vehicle, even when it is in its use position, because, for example, the person performing the installation is inexperienced or inattentive. As the use position hereby should be understood a position in which a person can sit or lie on the bench portion of the seat and brace himself against the backrest.

OBJECTS AND SUMMARY OF THE INVENTION

The object of the invention therefore is to create a vehicle seat which can easily be removed and installed and/or taken from a position of non-use into a use position and back, and in which it can nevertheless be assured that the seat can only be used when the installation has been completed properly and/or the securing device in the use position is effective.

Due to the rigid connection of the lock bolt to the vehicle floor, in the rear area of the seat frame one need only produce the form-fitting connection between the hook and the bolt in order to achieve a secure connection of the vehicle seat to the floor. The detent device on the upper fitting element and the counter detent device on the double-armed pivot level make it possible to assure with simple means that the backrest of the vehicle seat cannot be pivoted into its use position until the seat frame is form-fittingly connected with the lock bolt by means of the hook. Thus, the seat can only be used if it is properly anchored to the floor of the vehicle, which is especially important if the safety belt is attached to the supporting structure of the vehicle seat.

In one preferred embodiment the seat is connected with the floor of the vehicle so as to pivot about front lateral axis. The pivotability of the seat frame about a forward lateral axis simplifies the removal and installation, because for the connection of the front end of the seat frame to the vehicle floor it is sufficient to hang the seat frame in the forward lateral axis, or, if the forward lateral axis is provided on the seat frame, it is sufficient to hang the seat frame in mounts on the vehicle floor.

It is preferred that the spring-loaded hook is formed and arranged so that the seat frame need only be lowered in a pivoting motion about the forward lateral axis with its portion supporting the hook moving toward the lock bolt. As this movement progresses, the bolt forces the hook out of its locking position to such an extent that it can move past the bolt until it can engage behind the bolt.

The projection of the hook beyond the free end of the double-armed pivot lever assures in a simple manner that the pivot lever can only be pivoted by the bolt into the position in which the pivot lock of the upper fitting element is released.

In one embodiment of the double-armed pivot lever and the hook, a single spring is sufficient to bias both elements in the desired manner.

If the back is locked by the detent device into one of the two end positions of its pivot range, particularly in the fully forward pivoted position, it is sufficient to form the detent as a step in a control curve extending in the pivot direction of the upper fitting element.

So that it is assured, independent of finishing tolerances, that the hook is pivoted back into its locking position under the force of the spring that biases it to do so after the lock bolt has forced it to pivot out of the locking position as the hook is lowered toward the lock bolt, a certain amount of play is advantageously provided. If this play is undesirable, the seat can be formed so that the play is forcibly eliminated as the backrest is pivoted into the use position.

Resting the seat on elastically deformably support elements also contributes to the elimination of play.

It is also advantageous to secure the hook in its locking position so that it cannot unintentionally pivot into its release position. In a preferred embodiment, this securing is accomplished by means of the double-armed pivot lever by the advantageous forming of control means necessary for this pivot lever.

A curved track for controlling the double-armed pivot lever is preferably formed by the section of the control curve adjacent to the step.

To activate the hook to release the lock, a hand grip can be provided on the hook. However, this activation can also be accomplished by means of a cable or the like.

Because the hook generally is not capable of providing adequate security against a shifting of the seat in its longitudinal direction, in one preferred embodiment the lower fitting element is provided with at least one tongue, which rests against the outer surface of the lock bolt to secure against any shifting toward the rear of the forwardly projecting portion, when the seat frame is in the position in which the hook can engage behind the lock bolt. If the seat secured against longitudinal shifting by means of the front lateral axle and/or by the tongue, then the hook need only prevent an upward movement of the seat frame.

The invention is described in greater detail below with the aid of an exemplary embodiment illustrated in the drawings.

BRIEF DESCRIPTION OF THE DRAWINGS

FIGS. 7-16 each show a view of the hook, the double-armed lever, and the upper fitting element attached to the backrest in different positions relative to the lock bolt.

DETAILED DESCRIPTION OF THE INVENTION

Figure 1:
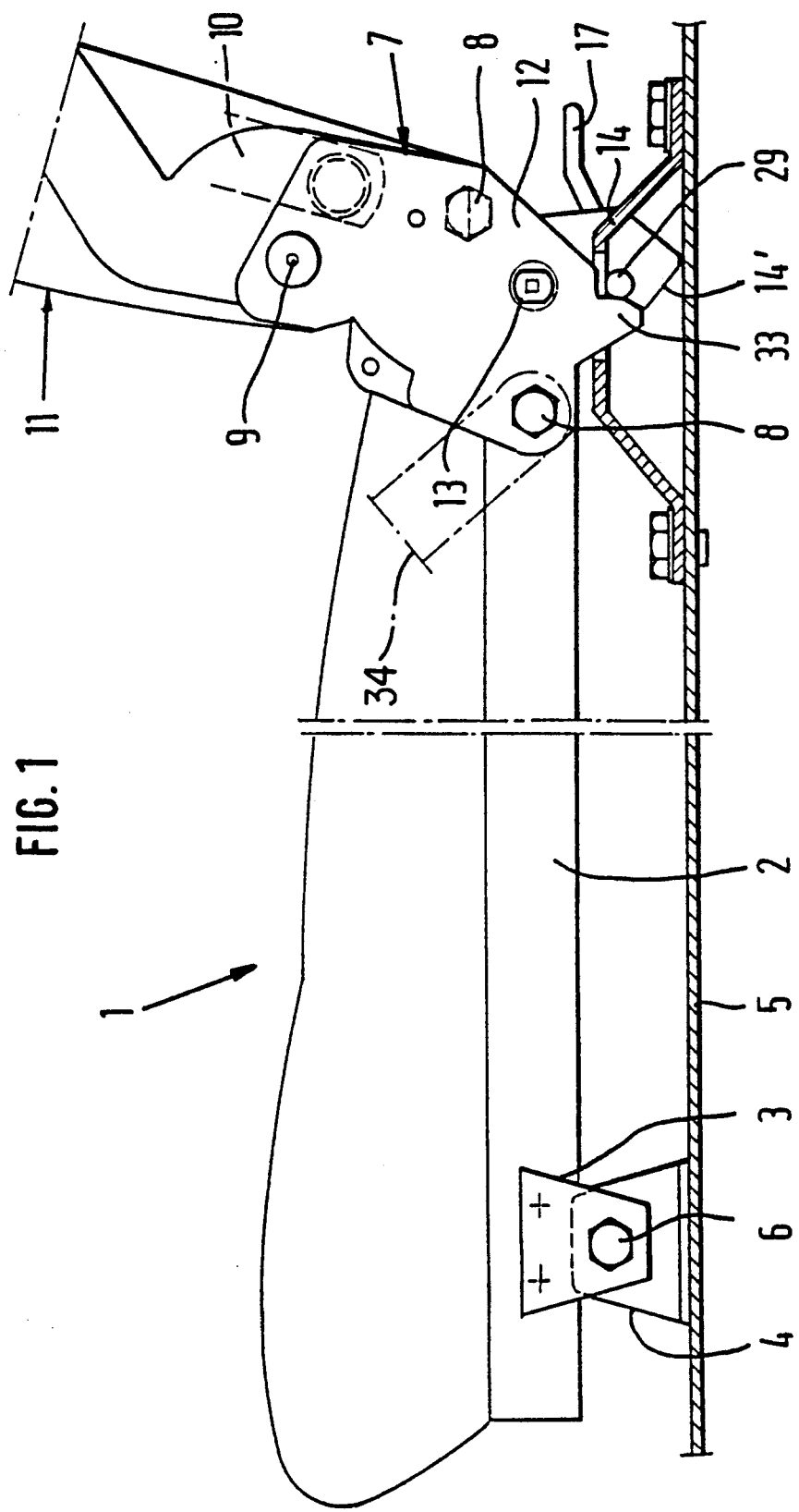
FIG. 1 is a schematic and partially illustrated side view of the exemplary embodiment in the use position.

The vehicle seat for the temporary forming of a third row of seats in a personal automobile has, as shown in FIG. 1, a bench portion 1, on the upholstery support 2 of which respective connecting plates 3 are attached on both sides in the area of the forward end section. These two identically formed and identically arranged connecting plates 3 contain bores that align with each other to receive a section of a forward lateral axis 6 which is securely connected with the vehicle floor 5 at a distance above it. Therefore, a pivoting movement of the entire seat about the lateral axle 6 is possible.

A lower fitting element 7 of a hinge fitting is secured at one side of the rear end section of the upholstery support 2 by means of screws 8. One end of a safety belt 34 is also secured here. The upper fitting element 10, which is connected with the lower fitting element 7 so as to pivot about a hinge axle 9, is rigidly connected with the upholstery support of the backrest 11 of the seat. On the other side of the seat, a known hinge fitting with a self-arresting adjusting drive connects the backrest 11 with the upholstery support 2 in such a manner that it is pivotable and can be secured in a selectable angular position.

As shown in FIGS. 3-6, the lower fitting element 7 is comprised of two plates 12 of identical shape and size, arranged at a distance from each other in the longitudinal direction of the hinge axle 9, between which the lower end section of the upper fitting element 10, which is also plate-like, engages.

Figure 2:
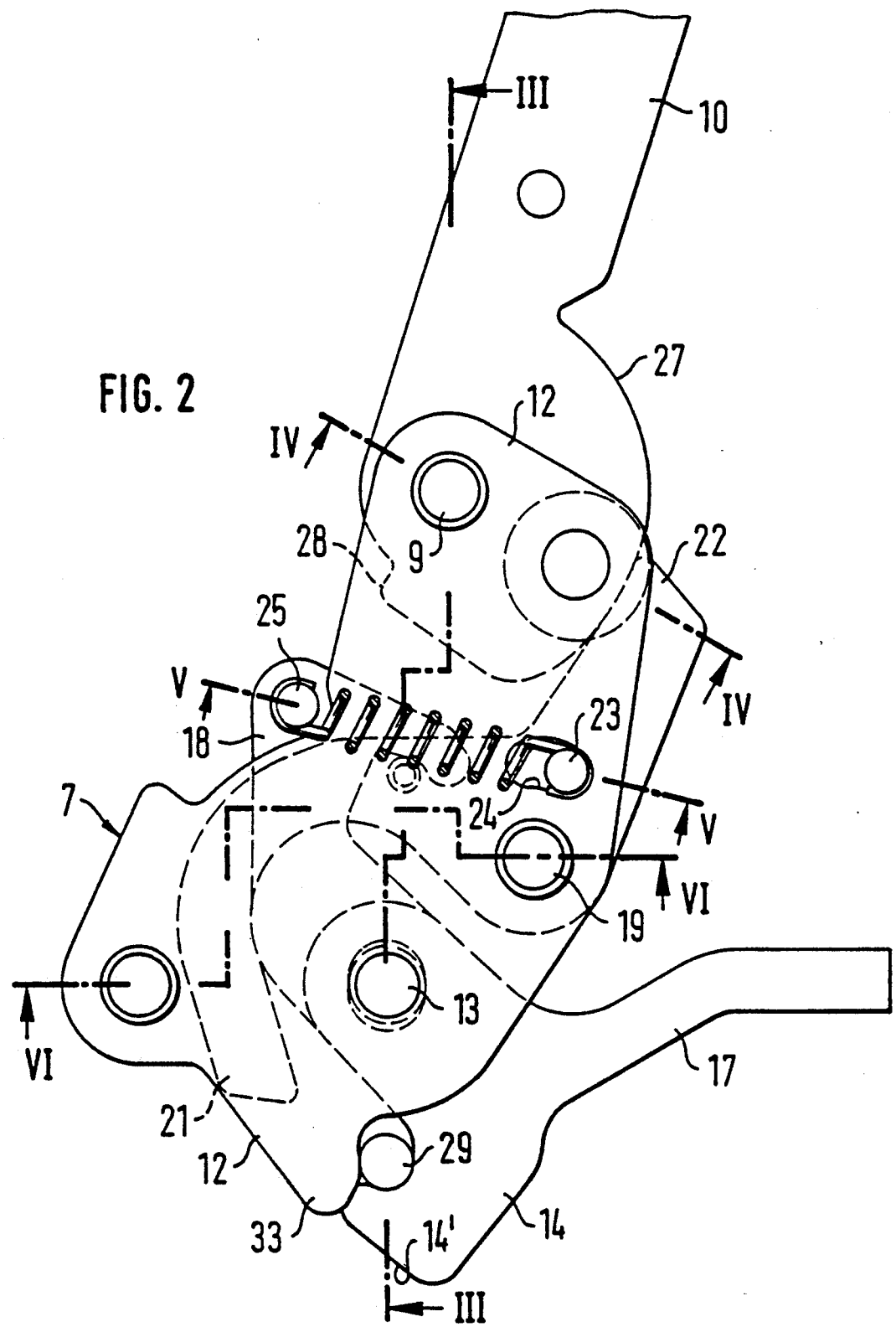
FIG. 2 is an enlarged view of the hinge fitting that connects the seat frame with the backrest and the structural components provided thereon.
Figure 3:
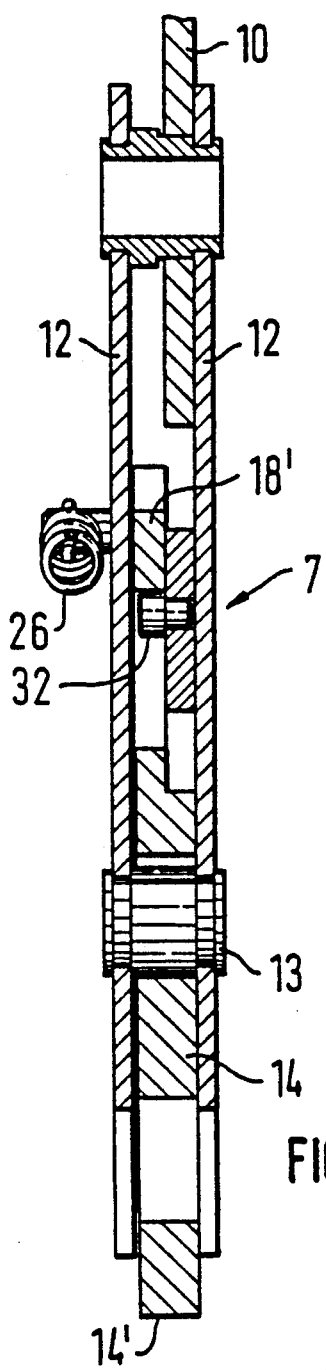
FIG. 3 is a section along the line III—III in FIG. 2.
Figure 4:
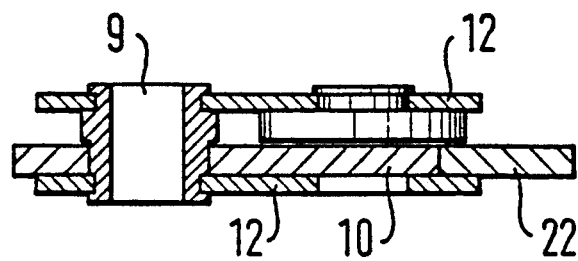
FIG. 4 is a section along the line IV—IV in FIG. 2.
Figure 5:
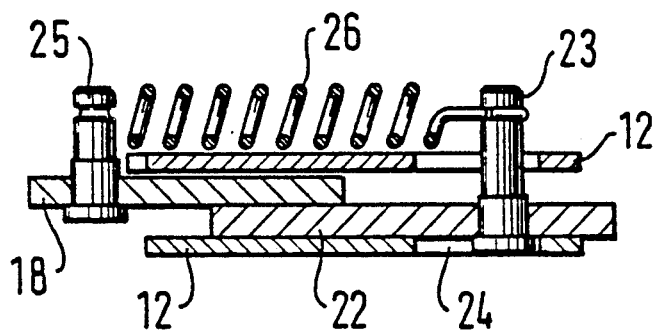
FIG. 5 is a section along the line V—V in FIG. 2.
Figure 6:
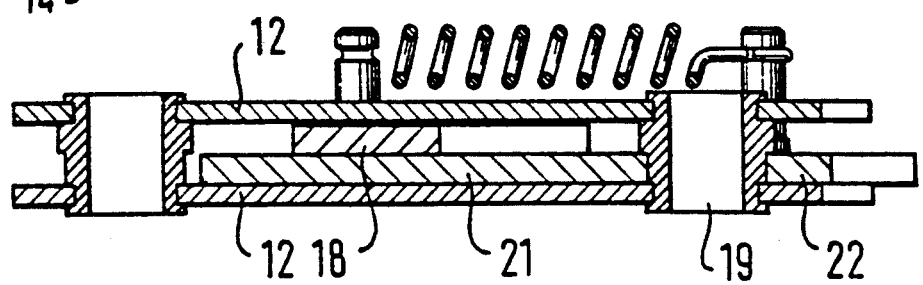
FIG. 6 is a section along the line VI—VI in FIG. 2.
Figure 9:
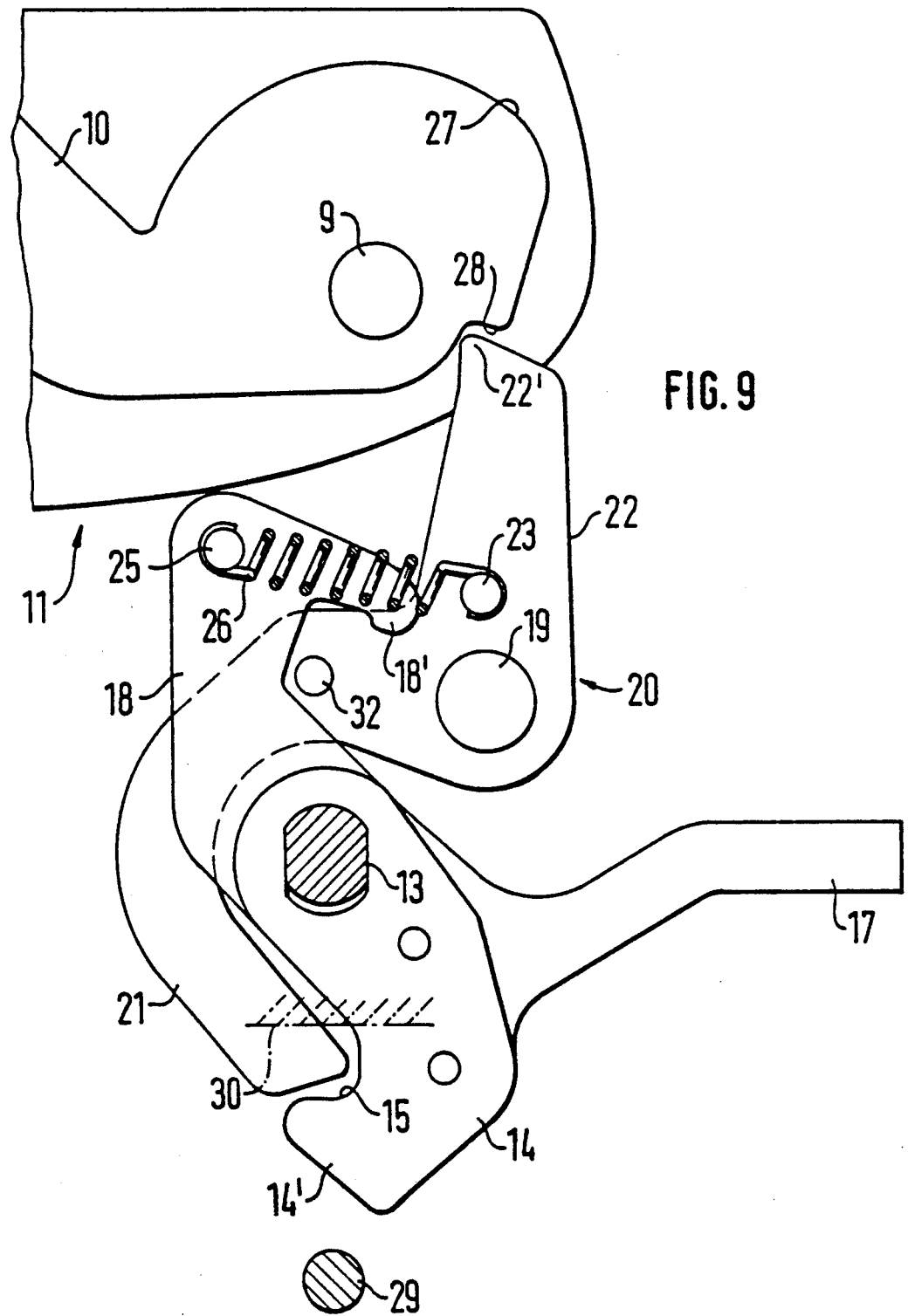

As shown particularly by FIG. 2, a mounting pin 13 is mounted below the hinge axle 9 in the two plates 12 so as to be rotatable but axially immovable. The mounting pin 13 has two lateral flattened sections in the area lying between the plates 12. A hook 14 is arranged on this mounting pin 13 in a suspended manner. As shown in FIG. 9, the passage opening in the hook 14 for the mounting pin 13 is adapted to a cross-sectional shape thereof to such an extent that the hook 14 is connected with the mounting pin 13 so as to rotate therewith. However, the hook 14, in the direction of the flattened sections on the mounting pin 13, can be shifted somewhat in the radial direction. This shifting direction lies at least approximately in the vertical direction when the seat is installed in the vehicle. A rearwardly projecting hand grip 17 is rigidly connected with the hook 14, and by means of the hand grip 17, the hook 14 together with the mounting pin 13 can be pivoted relative to the lower fitting element 7.

As shown, for example, in FIG. 9, the hook 14 arranged on the mounting pin 13 in a hanging manner, is formed by one arm of the double-armed lever, the other arm 18 of which extends essentially upward from the mounting pin 13 and ends in a relatively long, rearwardly projecting nose 18'.

In the area above and between the hinge axle 9 and the mounting pin 13, but rearwardly displaced relative thereto, a mounting sleeve 19 is secured in the two plates 12. The mounting sleeve 19 lies parallel to the hinge axle 9 and a double-armed pivot lever 20, which lies at least mostly between the plates 12, is rotatably mounted on the mounting sleeve 19. As shown primarily by FIGS. 5 and 6, the distance between the two plates 12 is selected such that the hook 14 with its arm 18 has space between them with the necessary play adjacent to the double-armed pivot lever.

The one arm 21 of the double-armed pivot lever 20 extends from the mounting sleeve 19 towards the front and is then guided in coils about the mounting pin 13. The arm 21 ends below the mounting pin 13 in the vicinity of the opening of the hook 14. Further, the end of arm 21 is displaced from the opening of the hook 14 in the longitudinal direction of mounting pin 13. The other arm 22 extends from the mounting sleeve 19 upward and ends somewhat below and behind the hinge axle 9.

Somewhat above the mounting sleeve 19 and lying parallel thereto on the arm 22, a stationary bolt 23 is attached which passes through a slot 24 formed in the plate 12. This slot 24 does not prevent the necessary pivot movement of the double-armed pivot lever 20. A second stationary bolt 25 is arranged in the corner area of plates 12 projecting upward above the plates 12. Bolt 25, which is parallel to bolt 23 of arm 18, also serves like the stationary bolt 23 to suspend a prebiased helical spring 26, which biases the hook 14 in the sense of a clockwise pivot movement (as viewed as shown in FIGS. 9-16) and biases the double-armed pivot lever in oppositely directed pivot motion.

The lower end section of the upper fitting element 10 forms a control curve 27 for the double-arm pivot lever 20, the upper, rounded corner area 22' of which can be pressed in the radial direction against the control curve 27 by the force of the helical spring 26. The control curve 27 forms a radial step 28 against which the free end of the arm 22 can be laid, when the backrest and the upper fitting element 10 are together folded completely forward, as shown in FIG. 9. The backrest finds itself in this position when the seat is installed in the vehicle.

Figure 7:
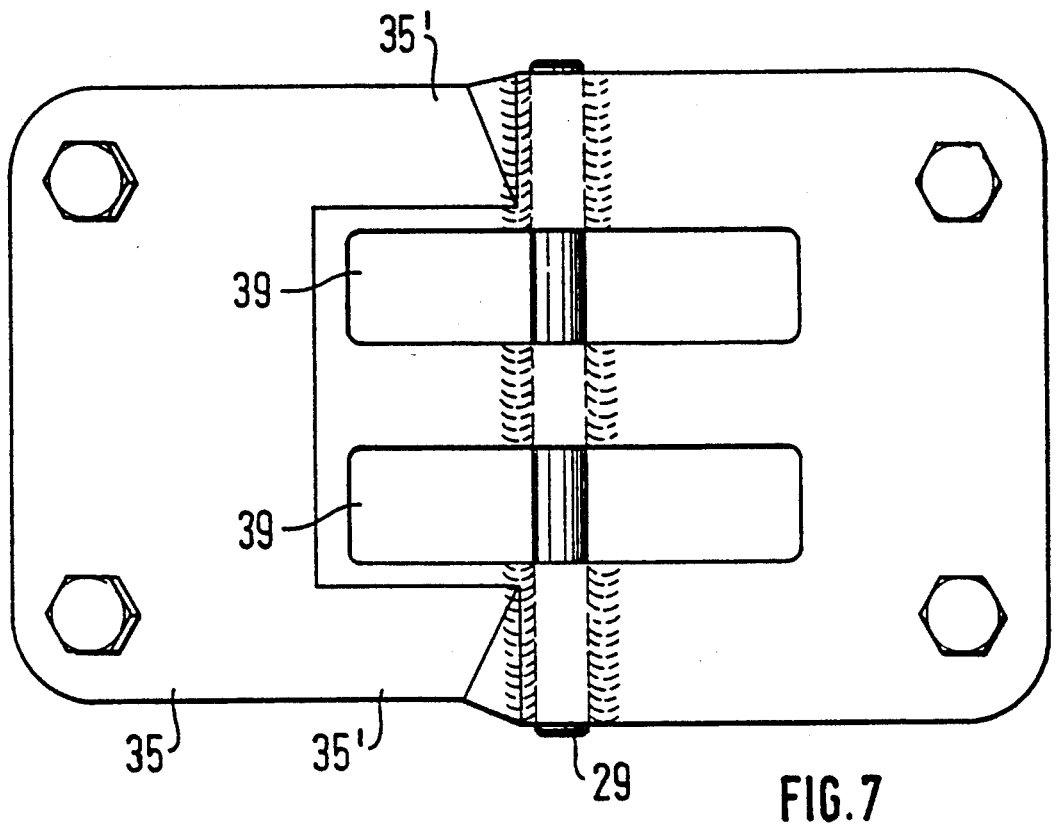
FIG. 7 is a top view of a support plate for the lock bolt.

During this installation, first the two sections of the forward lateral axle 6 are inserted through the connection plates 3 and the holder, whereby the lower fitting element 7 with the hook 14 is located above a lock bolt 29, which is parallel to the forward lateral axle 6 and is rigidly connected with the floor 5 of the vehicle. As shown in FIGS. 1 and 7, the bolt 29 is welded to the underside of a plate 35, which is screwed to the floor 5 of the vehicle and has an opening 39 that exposes the lock bolt 29 to accommodate the insertion of the hook 14. In the exemplary embodiment, two openings 39 are provided spaced from but adjacent to each other, so that the lock bolt 29 can also be engaged by the hook of a second seat arranged side-by-side with the first seat.

Figure 10:
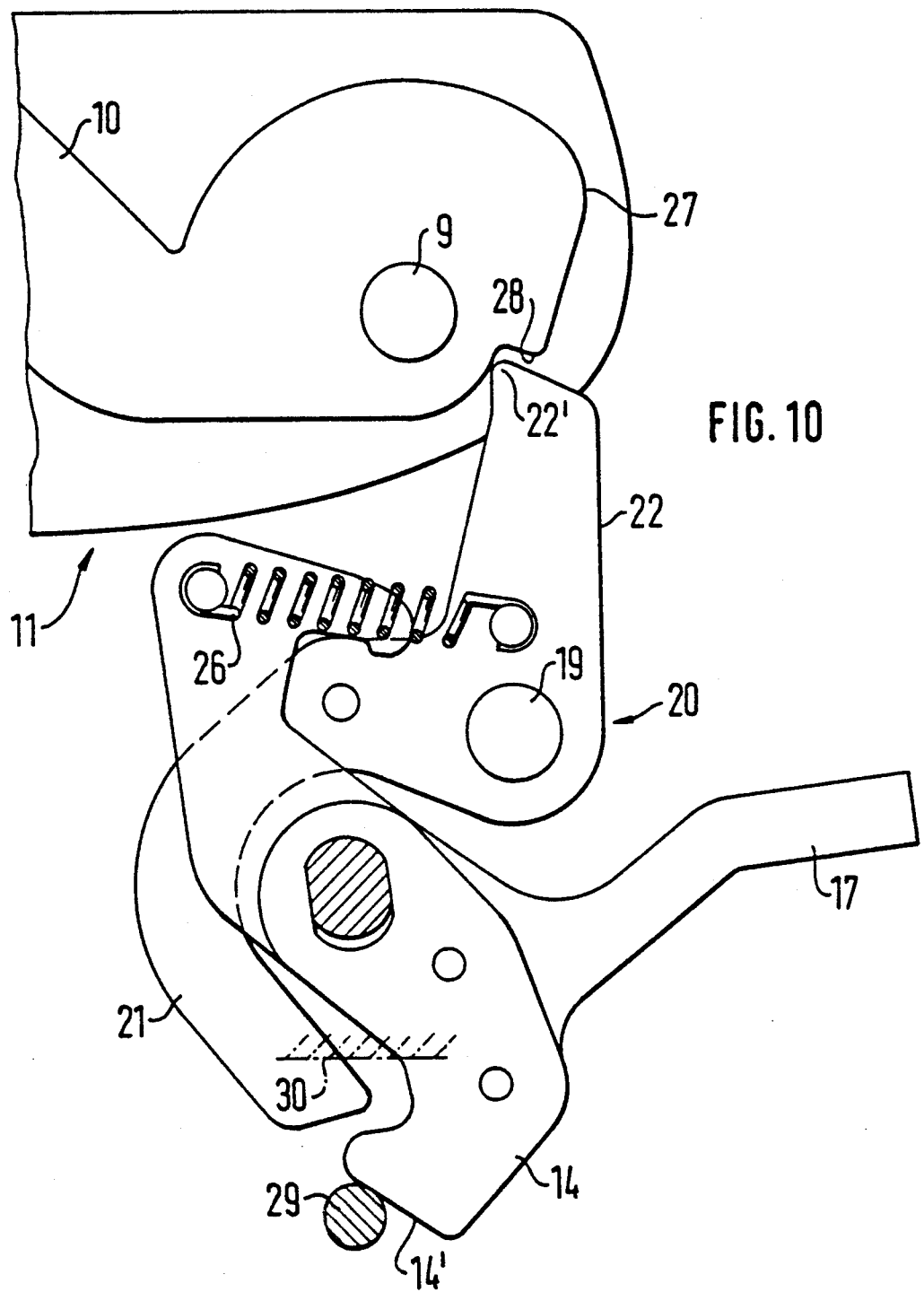
Figure 11:
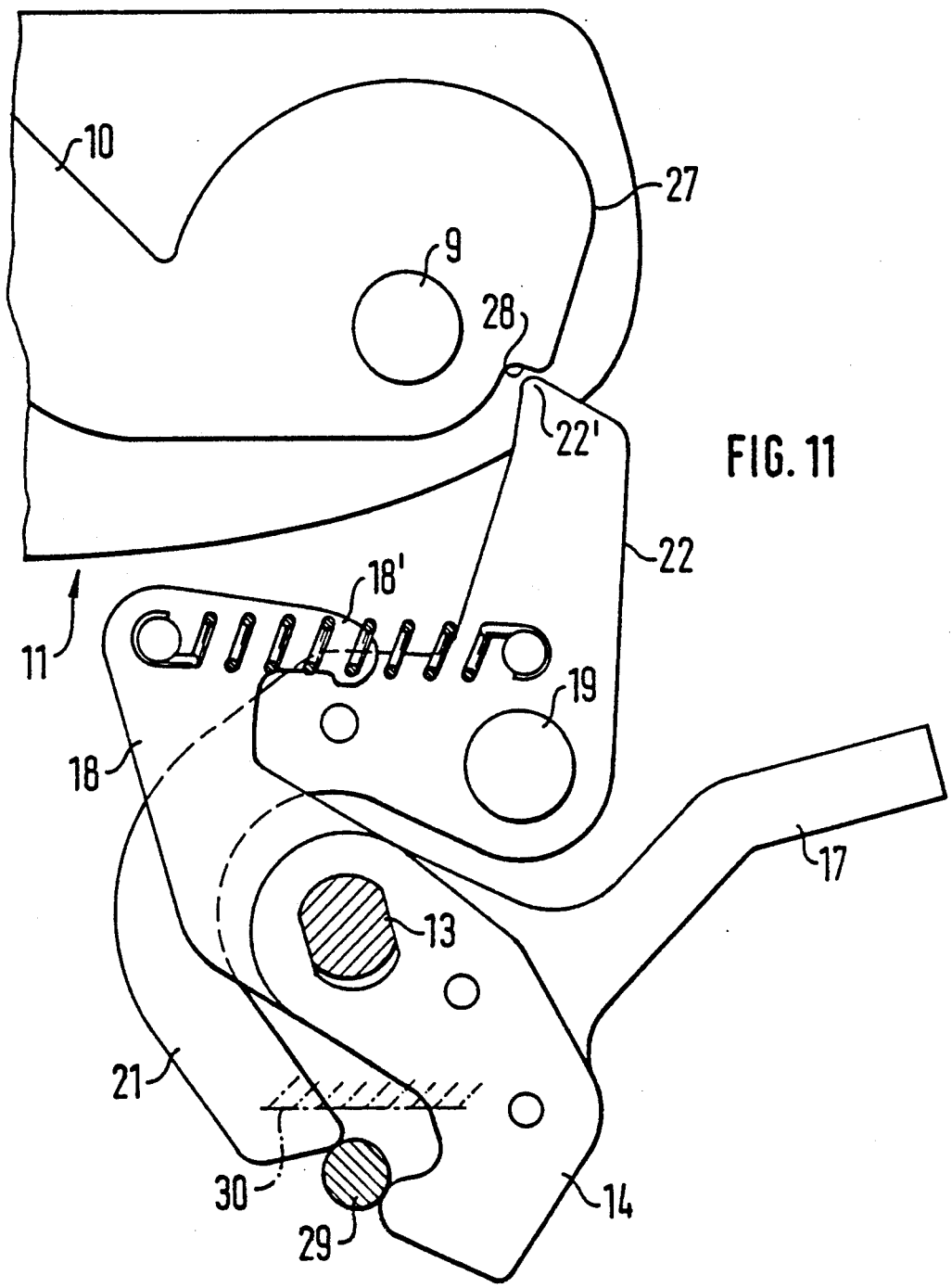

In order to form-fittingly connect the seat with the vehicle floor 5 even in the rear area of the seat frame, the rear end of the bench portion 1 is now pivoted downward about the forward lateral axle 6. As shown in FIG. 10, as this is done an angular surface 14' provided on the free end of the hook 14 first comes into contact against the upper side of the lock bolt 29. The hook 14 is therefore pivoted against the force of the helical spring 26 counterclockwise as viewed in FIG. 10, out of its locking position, as shown in FIG. 11. In this manner it becomes possible to continue lowering the rear end of the seat.

Next the lower end of the double-armed pivot lever 22 also comes into contact against the lock bolt 29 and thus experiences a clockwise pivot movement as viewed according to FIG. 11. In this manner the corner area 22' is removed from the control curve 27. Thus, corner area 22' of arm 22 release element 10 as soon as the lower end of arm 21 is moved in a counter clockwise direction by lock bolt 29. During the lowering of the rear end of the seat, once a stop 30 provided on each side of the seat frame has achieved its lowest position, which is illustrated in FIGS. 12-16 by the fact that this stop 30 lies against the top of the lock bolt 29, then the double-armed pivot lever 20 is pivoted away from the lock bolt 29 out of its original position to such an extent that, as shown in FIG. 12, the corner area 22' completely exposes the radial step 28.

Figure 8:
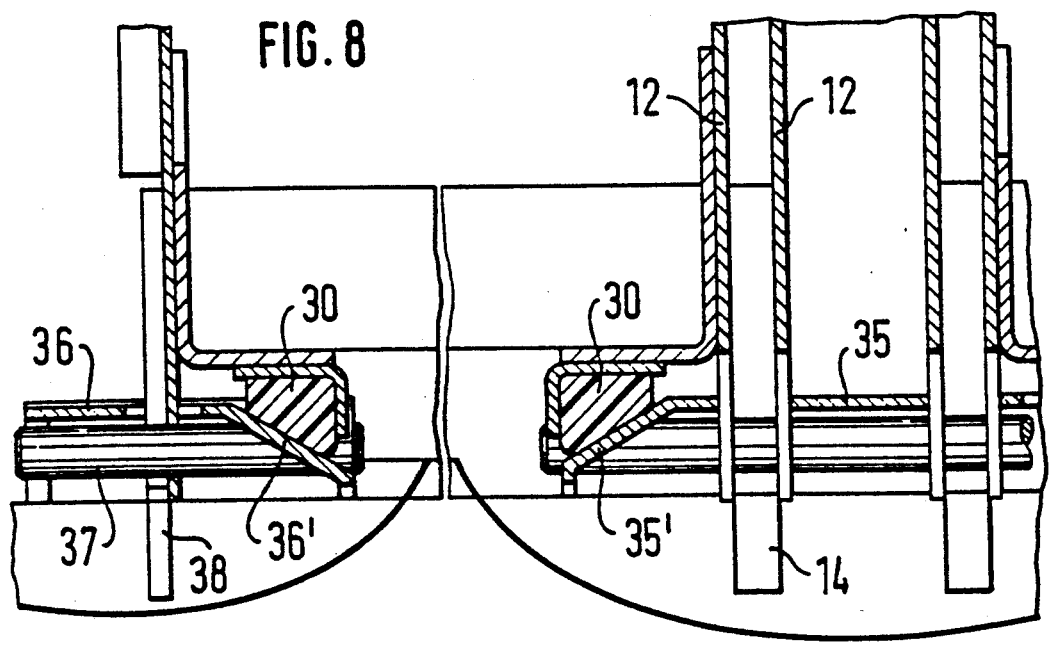
FIG. 8 is a partially illustrated section in the longitudinal direction of the lock bolt through the base plate as well as through elastic support elements.

As shown in FIG. 8, the two stops 30 are each formed by a block of plastic or rubber that is elastically deformable to a limited degree and comes into contact with respective surfaces 35' of plate 35 or 36' of a corresponding plate 36, which are inclined in the lateral direction of the seat. The plate 36 supports a lock bolt 37, which can be engaged from behind by a hook 38 arranged on the other side of the seat on the hinge fitting provided there. Both inclined surfaces 35' and 36' rise toward the adjacent side of the seat.

Figure 12:
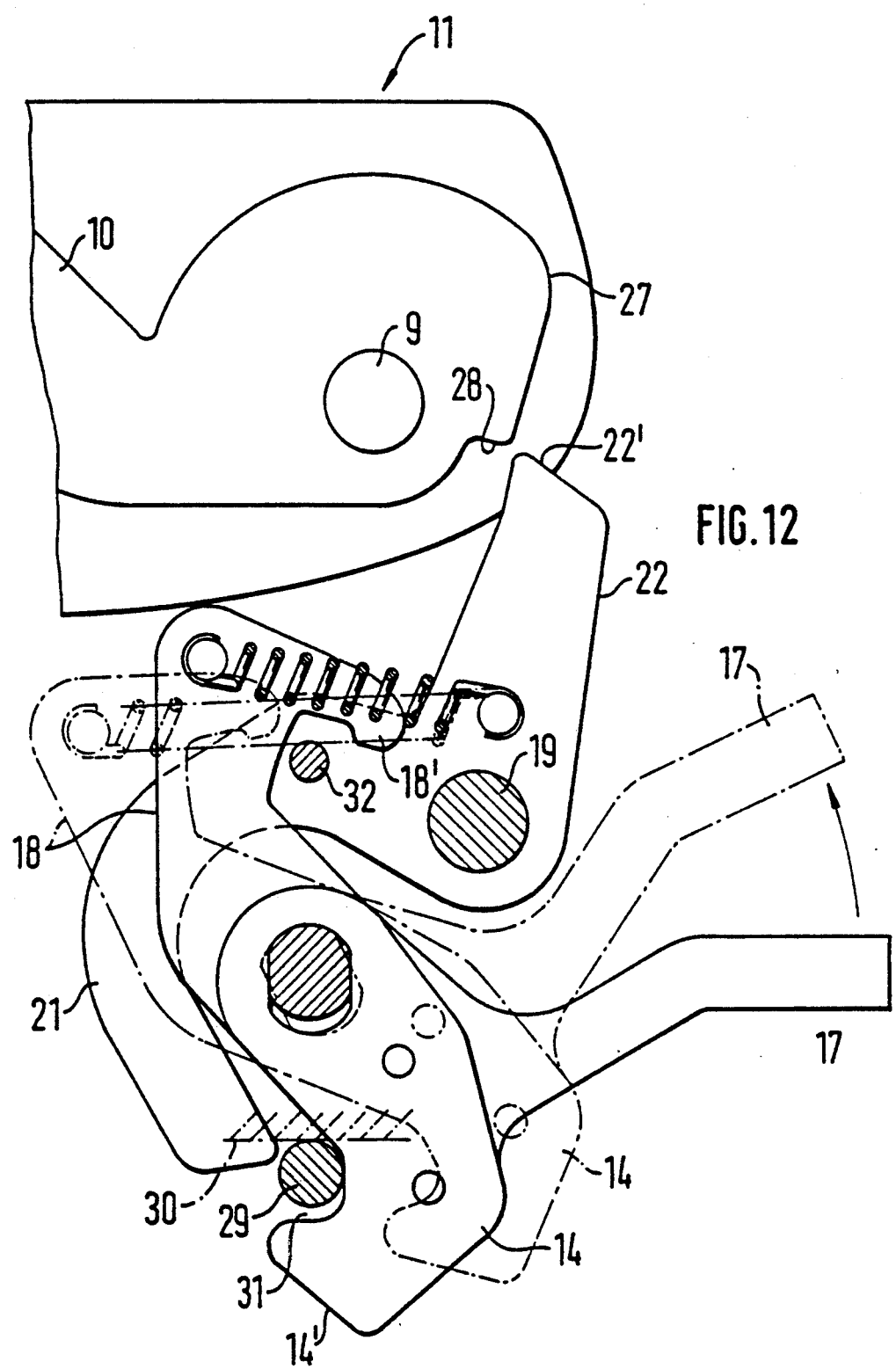
Figure 13:
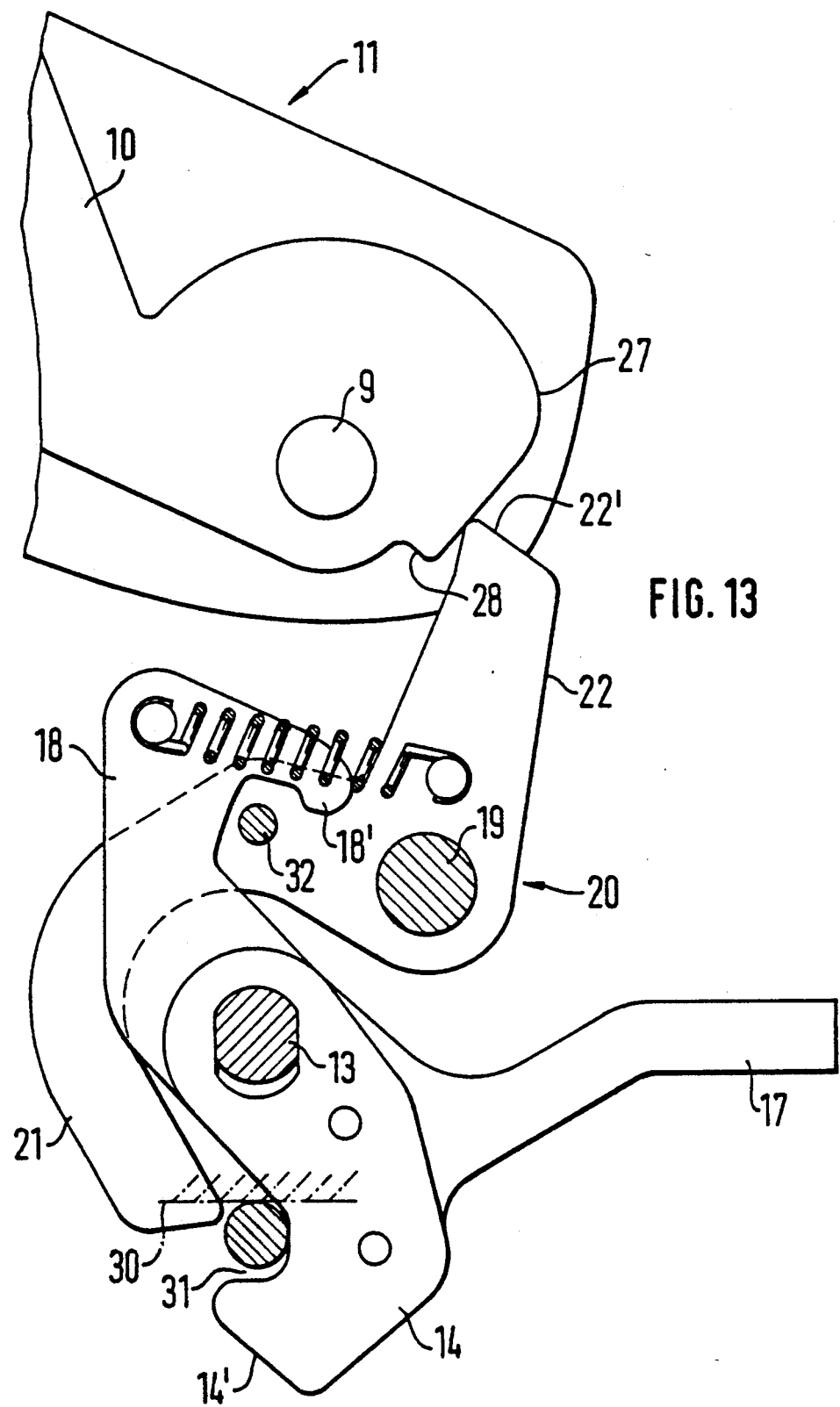
Figure 14:
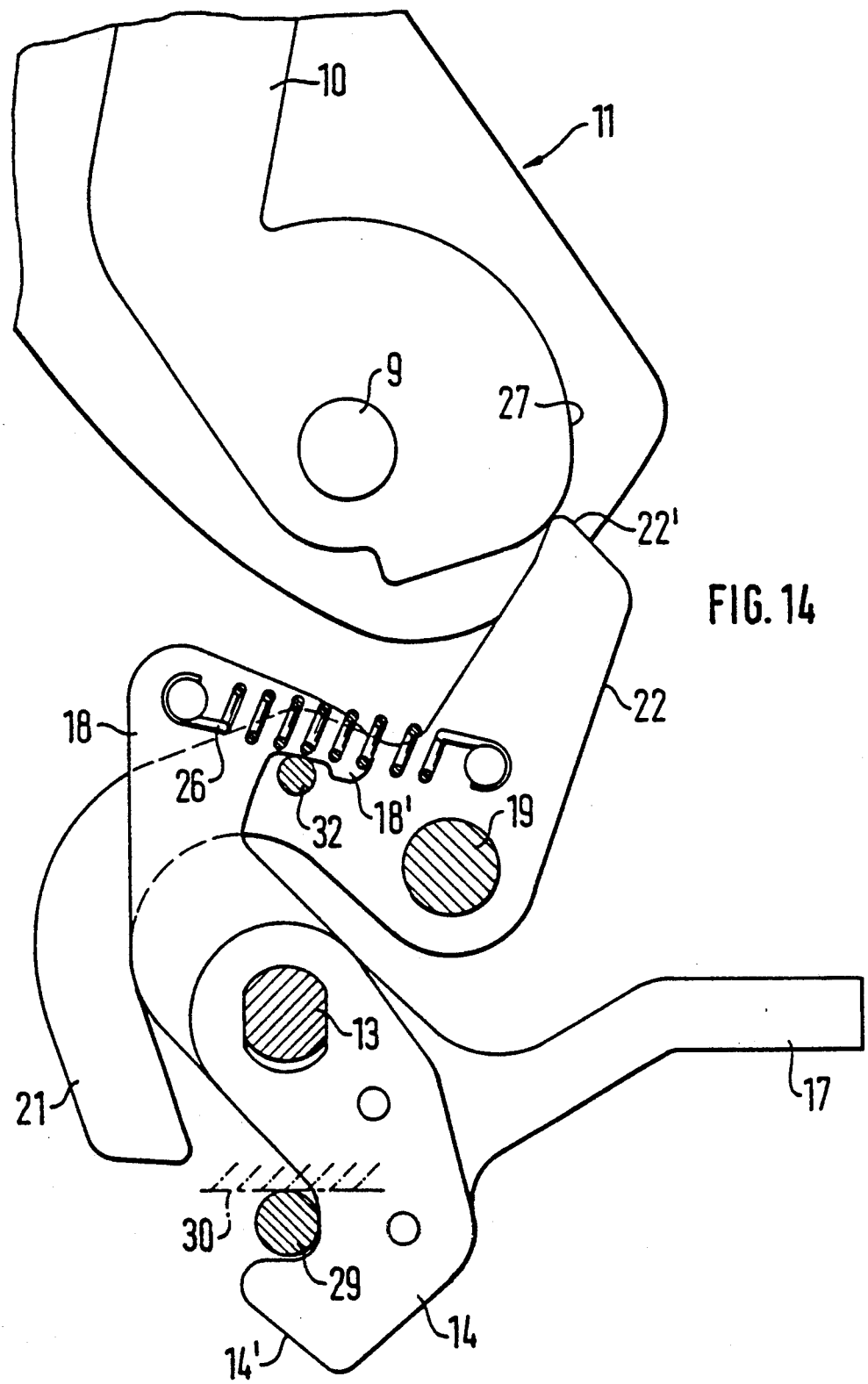
Figure 15:
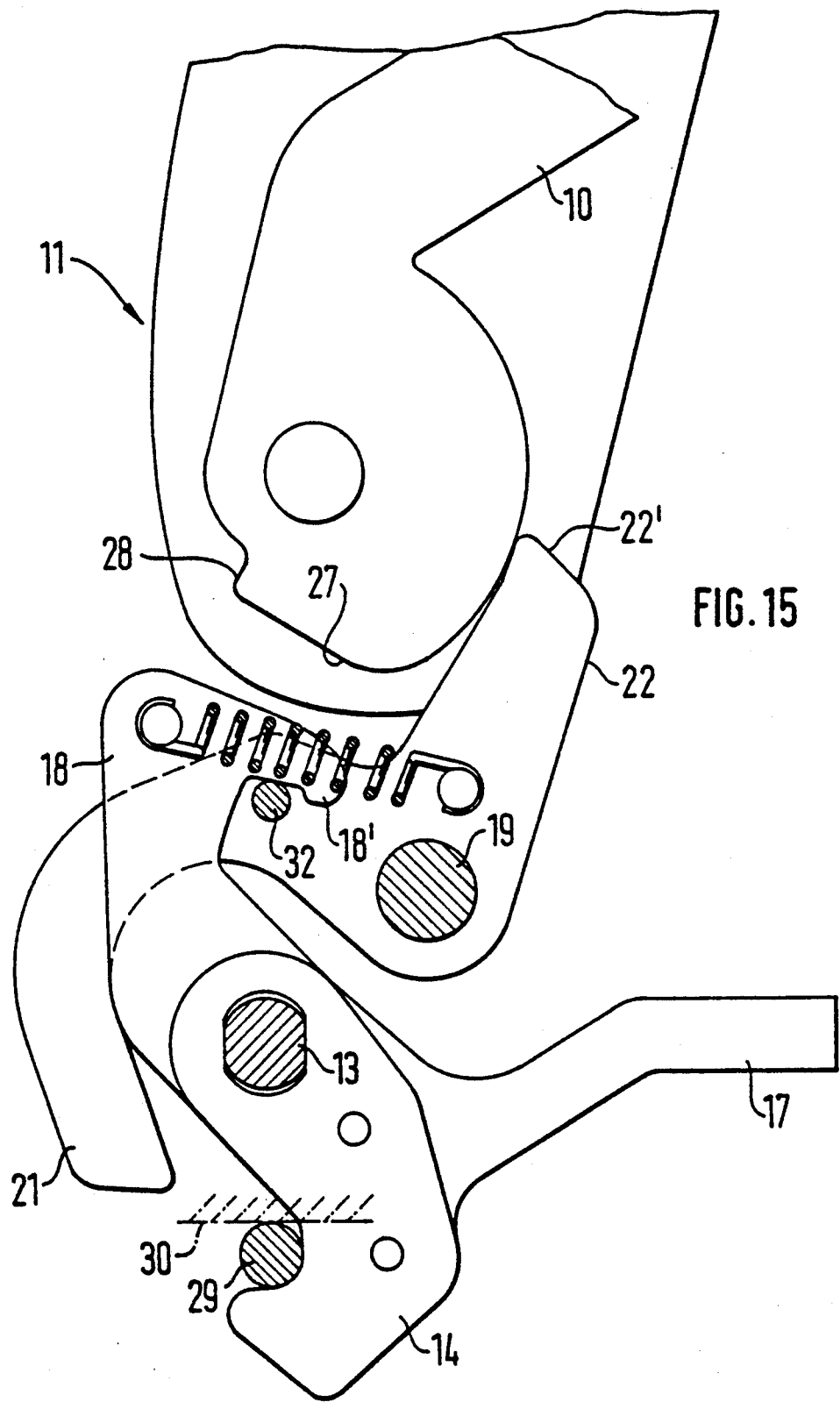

As shown in FIG. 12, the hook 14, in the lowest position of the seat frame, can pivot back into its locked position, where it engages beneath the lock bolt 29 from behind. However, an intermediate space 31 is provided between the underside of the lock bolt 29 and its facing inner side of the hook 14.

Figure 16:
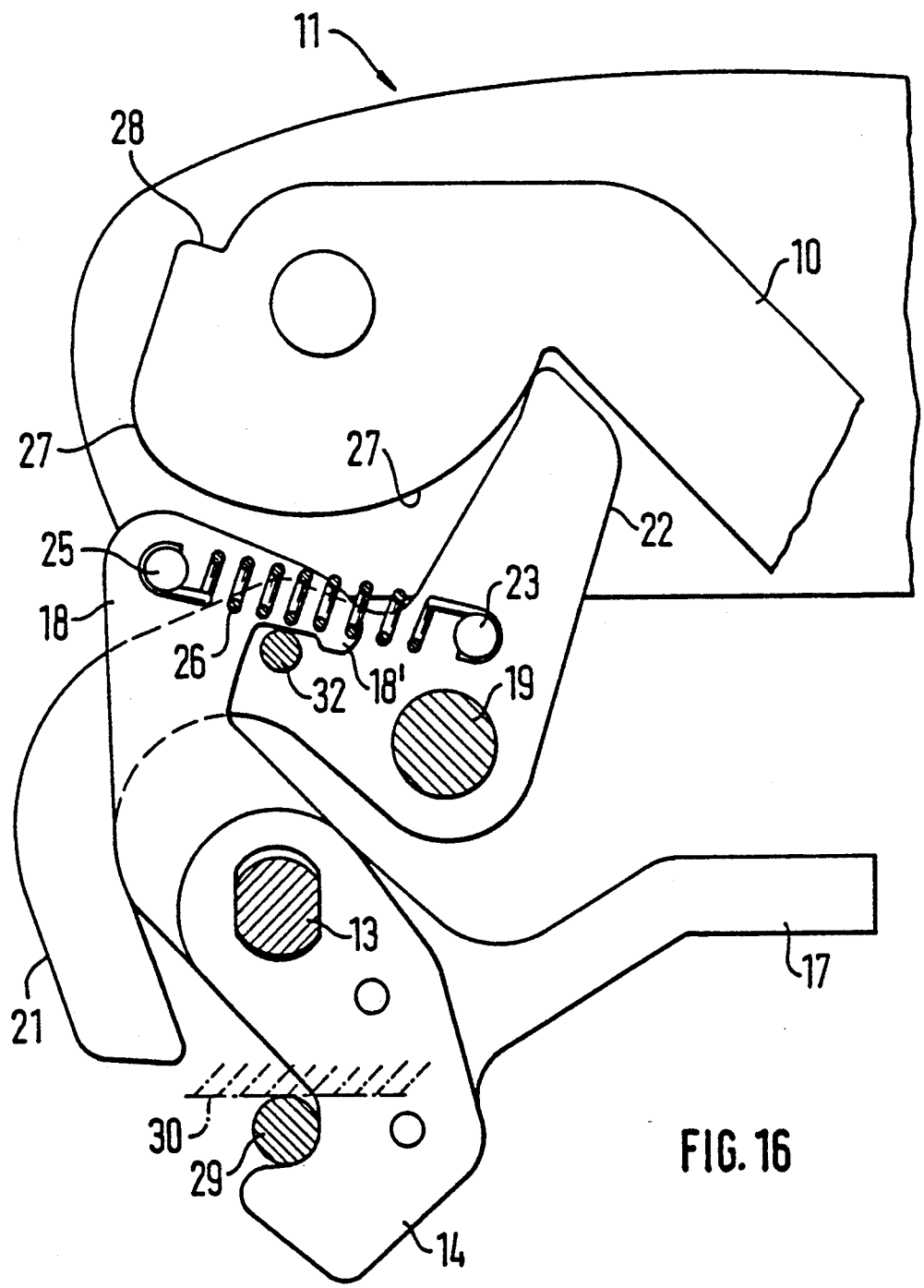

If the backrest is then pivoted into the use position, which corresponds to a pivot direction of the upper fitting element 10 in the clockwise direction as viewed according to FIG. 12, the corner area 22' comes back into contact against the control curve 27, namely at first against a section in which the spacing from the hinge axle 9 increases with an increasing angle of rotation. This has the result that the double-armed pivot lever 20 is pivoted even further clockwise as viewed according to FIG. 12 into the position illustrated in FIG. 14, whereby the tension in the helical spring 26 increases. During this pivoting movement a carrier pin 32 arranged at a distance from the mounting sleeve 19 and parallel thereto comes into contact against the underside of the nose 18' and begins to pull the hook 14 upward. But before the backrest has reached the use position illustrated in FIG. 15, the carrier pin 32 has pulled the hook 14 so far upward that it abuts the lower side of the lock bolt 29 without play. Since in addition, as shown in FIG. 1, a downwardly extending projection 33 of the lower fitting element 7 abuts the forwardly projecting side of the lock bolt 29 without play, the seat then has no play and is properly secured to the floor 5 of the vehicle. This condition remains in effect when the back rest 11 is pivoted completely backward into a horizontal position, as shown in FIG. 16.

In this angular position the upper fitting element 10 is supported on the free end of the arm 22 in a form-fitting manner.

To remove the seat from the vehicle the backrest 11 must be again pivoted forward into the position illustrated in FIG. 12. Only then can the hand grip 17 be pivoted upward into the position illustrated with broken lines in FIG. 12, where the hook 14 releases the lock bolt 29. Because of the co-rotational connection of the hook 14 with the mounting pin 13, its rotational movement is transferred by means of a connection shaft to the hook 38 provided on the other side of the seat. In order to pivot this other hook 38 into the released position, no hand grip need be provided or activated.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat including a seat backrest having a useful range and having at least one hinge fitting having a hinge axle, an upper fitting element of the hinge fitting being associated with the backrest and a lower fitting element of which is associated with the seat frame and having a hook adapted to engage and disengage a lock bolt, said hook being arranged to be suspended, pivoted, and engage, in its locking position, said lock bolt, said lock bolt running parallel to the hinge axle, comprising:

a seat frame adapted to be connected with the vehicle floor at a distance in front of a pivot axis (13) of the hook (14); wherein said lock bolt (29) is rigidly connected with the vehicle floor;

the upper fitting element (10) has a detent (28) in a surface (27) extending in its pivot direction;

a counter-detent (22') is provided on one end of a double-armed pivot lever (20) which is pivotably mounted on the lower fitting element (7) and is spring-loaded in the sense of a movement of the counter-detent (22') toward the detent (28);

the detent (28) and the counter-detent (22') lie within an angular position of the upper fitting element (10) which lies outside the useful range of the backrest, engage with one another, and form a form-fitting pivot lock for the upper fitting element (10); and the other end of the double-armed pivot lever (20) is provided with an angular surface by means or which the double-armed pivot lever (20) is forcibly pivoted from the lock bolt (29) into a released position, where the detent (28) and the counter-detent (22') are disengaged, and the rear end of the seat is lowered into the use position, where it is form-fittingly connected with the lock bolt (29) by means of the hook (14).

2. The seat according to claim 1, wherein the seat frame, at its forward connecting point, is pivotable relative to the vehicle floor about a forward lateral axle (6) that lies parallel to the pivot axis of the hook (14).

3. The seat according to claim 1, wherein the hook (14), which is spring-loaded in the sense of a pivot movement toward its locked position, has an angular surface (14') by means of which the free hook end can be pivoted away from the lock bolt (29) out of the locked position during a pivoting movement of the seat about its forward lateral axle (6) in its use position into an angular position, where the free hook end can move past the lock bolt (29) and which angular surface (14') then again releases the hook for a return to its locked position no later than when the rear end of the seat is again completely lowered against the floor of the vehicle.

4. The seat according to claim 3, wherein a free hook end in the locked position of the hook (14) projects beyond the end of the double-armed pivot lever (20) provided with the angular surface toward the lock bolt (29) when the detent (28) and the counter-detent (22') are in engagement.

5. The seat according to claim 1, wherein the hook (14) is formed by one arm of a double-armed lever and a pre-biased spring (26) providing the spring-loading acts upon the other arm (18), pointing away from the lock bolt (29), and the other side of the spring acts on the arm (22) of the double-armed pivot lever (20) which contains the counter-detent (22').

6. The seat according to claim 1, wherein the detent is formed by a step (28) in a control curve (27) extending in the pivot direction of the upper fitting element (10), against which control curve (27) the free end (22') of the double-armed pivot lever (20) rests.

7. The seat according to claim 1, further including a stop device (30) which limits the pivot range of the seat about the forward lateral axis (6) in the use position in such a manner that an amount of play (31) is present between the lock bolt (29) and its facing surface of the hook (14) engaging behind it, and that the hook can slide laterally to its pivot axis (13) by an amount that will eliminate this play (31).

8. The seat according to claim 7, further including a carrier element (32) provided on the double-armed pivot lever (20) at a distance from its pivot axis (19) and wherein a material section (18') of the hook (14) projects into the path of movement of this carrier element (32), and wherein a curved track (27) is provided on the upper fitting element (10) associated with the backrest, which curved track (27) pivots the double-armed pivot lever (20) during a pivoting movement of the backrest in the use position in such a manner that the hook (14) is pulled away from the carrier element (32) into a position in which it rests against the lock bolt (29) with no play.

9. The seat according to claim 8, wherein the carrier element is formed by a pin (32) arranged above the pivot axis (1) of the hook (14), parallel to the pivot axis (19) of the double-armed pivot lever (20) and remaining apart therefrom, and the material section of the hook (14) is formed by a hook-like end section (18') of the arm (18) which together with the hook (14) forms a double-armed pivot lever.

10. The seat according to claim 9, wherein the hook (14) in the use position of the backrest and in its pivot range between the use position and a position pivoted fully toward the rear is secured against pivoting by the pin (32).

11. The seat according to claim 8, wherein the track is formed by the section of the control curve adjoining the step (28).

12. The seat according to claim 1, further including a hand grip (17) provided on the hook (14).

13. The seat according to claim 1, wherein the lower fitting element (7) has a material section (31) which rests against a lock bolt (29) to secure it against longitudinal movement.

14. The seat according to claim 2, wherein the hook (14), which is spring-loaded in the sense of a pivot movement toward its locked position, has an angular surface (14') by means of which the free hook end can be pivoted away from the lock bolt (29) out of the locked position during a pivoting movement of the seat about its forward lateral axle (6) in its use position into an angular position, where the free hook end can move past the lock bolt (29) and which angular surface (14') then again releases the hook for a return to its locked position no later than when the rear end of the seat is again completely lowered against the floor of the vehicle.

* * * * *